United States Patent
Kim et al.

(10) Patent No.: US 6,771,648 B1
(45) Date of Patent: Aug. 3, 2004

(54) METHOD AND APPARATUS FOR A DYNAMIC CALL ADMISSION CONTROL ALGORITHM

(75) Inventors: Hyong S. Kim, Pittsburgh, PA (US); Debashis Basak, Allison Park, PA (US)

(73) Assignee: Marconi Communications, Inc., Warrendale, PA (US)

( * ) Notice: Subject to any disclaimer, the term of this patent is extended or adjusted under 35 U.S.C. 154(b) by 0 days.

(21) Appl. No.: 09/282,980

(22) Filed: Mar. 31, 1999

(51) Int. Cl.[7] .............................................. H04L 12/56
(52) U.S. Cl. ..................... 370/395.2; 370/230; 370/235
(58) Field of Search ........................ 370/360, 229–236, 370/395.21, 395.41, 395.42, 395.43, 236.1, 395.1, 395.2, 410, 468

(56) References Cited

U.S. PATENT DOCUMENTS

| | | | | |
|---|---|---|---|---|
| 5,519,689 A | * | 5/1996 | Kim ........................... | 370/232 |
| 5,687,167 A | * | 11/1997 | Bertin et al. ................. | 370/254 |
| 5,949,757 A | * | 9/1999 | Katoh et al. ................. | 370/232 |
| 5,953,338 A | * | 9/1999 | Ma et al. ............... | 370/395.21 |
| 5,959,991 A | * | 9/1999 | Hatono et al. .............. | 370/395 |
| 6,046,981 A | * | 4/2000 | Ramamurthy et al. ...... | 370/232 |
| 6,097,722 A | * | 8/2000 | Graham et al. ......... | 370/395.21 |
| 6,141,322 A | * | 10/2000 | Poretsky ..................... | 370/231 |
| 6,144,639 A | * | 11/2000 | Zhao et al. .................. | 370/235 |
| 6,157,613 A | * | 12/2000 | Watanabe et al. ........... | 370/229 |
| 6,160,818 A | * | 12/2000 | Berger et al. ................ | 370/468 |
| 6,256,310 B1 | * | 7/2001 | Kim et al. ............. | 370/395.43 |
| 6,459,681 B1 | * | 10/2002 | Oliva .......................... | 370/232 |

OTHER PUBLICATIONS

Guerin, Roch, Ahmadi, Hamid, Naghshineh, Mahmoud, "Equivalent Capacity and Its Application to Bandwidth Allocation in High–Speed Networks", *IEEE Journal on Selected Areas in Communications*, vol. 9, No. 7, Sep. 1991, pp. 968–981.

* cited by examiner

*Primary Examiner*—Dang Ton
*Assistant Examiner*—Tri H. Phan
(74) *Attorney, Agent, or Firm*—Ansel M. Schwartz

(57) ABSTRACT

A switch for a network. The switch includes an input port mechanism which receives traffic of connections from the network. Each connection has a priority. The switch includes an output port mechanism which sends traffic of connections to the network. The switch includes a controller which serves connections and which monitors the connections received by the input port mechanism and sent by the output port mechanism and releases connections according to a connection's priority when a predetermined condition exists in the switch. The controller is connected to the input port mechanism and the output port mechanism. Each connection requests a specific bandwidth from the controller. A method for switching connections. The method includes the steps of monitoring traffic of connections received by a switch. Then there is the step of releasing connections from the switch according to the connection's priority when a predetermined condition in the switch exists.

15 Claims, 10 Drawing Sheets

US 6,771,648 B1

METHOD AND APPARATUS FOR A DYNAMIC CALL ADMISSION CONTROL ALGORITHM

FIELD OF THE INVENTION

The present invention pertains to a switch which releases connections according to a connection's priority when a predetermined condition exists in the switch. More specifically, the present invention pertains to a switch which releases connections according to a connection's priority when an overload condition exists in the switch.

BACKGROUND OF THE INVENTION

Current call admission control (CAC) algorithms generally are based only on traffic characteristics specified by a user. However, for most connections, it is very difficult to predict the nature of traffic accurately. Typically, the traffic characteristics of such connections are either over- or under-estimated. Let us consider the impact on overall link utilization while relying on traffic characteristics specified by user. Under-estimation of traffic can lead to excess traffic to link. However, with policing/shaping of traffic at the user network interface (UNI), this situation is avoided. Over-estimation, on the other hand, can lead to the resultant traffic being lower than expected leading to under-utilization of link bandwidth.

High-speed fast-packet-switched network architectures are capable of supporting a wide range of connections with different bandwidth requirements and traffic characteristics. Providing quality of service (QoS) in networks in terms of delay and bandwidth requires provisioning of network resources. While this environment provides increased flexibility in supporting various services, its dynamic nature poses difficult traffic control problems when trying to achieve efficient use of network resources. One such problem is the issue of bandwidth management and allocation. Due to the statistical multiplexing of all connections at the physical layer and the varying transmission rates by connections, it is important to characterize, both the effective bandwidth of a single connection and several multiplexed connections. Such characterization can be used to compute metrics for efficient bandwidth management, routing, and call control procedures. Based on statistical characteristics and desired grade of service, researchers in R. Guerin, H. Ahmadi, and M. Naghshineh. Equivalent capacity and its application to bandwidth allocation in high-speed networks. *IEEE Journal on Selected Areas in Communication*, 9(7):968–981, September 1991, incorporated by reference herein, have proposed approximate expressions for effective bandwidth or equivalent capacity computations.

A CAC algorithm based on a metric of effective bandwidth, can be summarized as follows. At any given time a new connection is admitted if:

$$B^c_{\mathit{eff}} + B^l_{\mathit{eff}} \leq B_{\mathit{link}}, \quad (1)$$

where, $B^c_{\mathit{eff}}$ denotes the effective bandwidth of new connection, $B^l_{\mathit{eff}}$ denotes the effective bandwidth of aggregate traffic on a link, and $B_{\mathit{link}}$ denotes the maximum link capacity or line rate. If the connection is admitted, the effective bandwidth of link is updated as, $B^l_{\mathit{eff}} + B^c_{\mathit{eff}} = B^l_{\mathit{eff}}$, otherwise it remains unchanged. Similarly, a tear-down of an established connection results in link effective bandwidth being decremented by the effective bandwidth of torn-down connection.

While the above approach is simple, it relies on the user/network being able to predetermine the traffic characteristics of a connection. However, for most connections, it is very difficult to predict the nature of traffic accurately. Typically, the traffic characteristics of such connections are either over or under-estimated. Let us consider the impact on overall link utilization while relying on traffic characteristics specified by user. Under-estimation of traffic can lead to excess traffic to link. However, with policing/shaping of traffic at the user network interface (UNI), this situation is avoided. Over-estimation, on the other hand, can lead to the resultant traffic being lower than expected leading to under-utilization of link bandwidth.

The present invention provides a dynamic CAC to overcome the problem of under-utilization of link bandwidth. The scheme, using periodic measurements, keeps track of various utilization parameters. These include the current link utilization, the variation in link utilization, buffer occupancy, and rate of change of buffer occupancy. Based on the above measurements a dynamic estimate of the effective bandwidth of the aggregate traffic on link is computed and admittance of new calls judged based on this.

SUMMARY OF THE INVENTION

The present invention pertains to a switch for a network. The switch comprises an input port mechanism which receives traffic of connections from the network. Each connection has a priority. The switch comprises an output port mechanism which sends traffic of connections to the network. The switch comprises a controller which serves connections and which monitors the connections received by the input port mechanism and sent by the output port mechanism and releases connections according to a connection's priority when a predetermined condition exists in the switch. The controller is connected to the input port mechanism and the output port mechanism. Each connection requests a specific bandwidth from the controller.

The present invention pertains to a method for switching connections. The method comprises the steps of monitoring traffic of connections received by a switch. Then there is the step of releasing connections from the switch according to the connection's priority when a predetermined condition in the switch exists.

The present invention pertains to a switch for a network. The switch comprises an input port mechanism which receives traffic of connections from the network. The switch comprises an output port mechanism which sends traffic of connections to the network. The switch comprises a controller which provides service to traffic of connections received at the input port mechanism and which are to be sent out the output port mechanism. The controller monitoring the traffic of connections received by the input port mechanism and sent out the output port mechanism and adjusting the service provided to the connections based on the traffic of connections received by the input port mechanism and sent out the output port mechanism. The controller is connected to the input port mechanism and the output port mechanism.

The present invention pertains to a switch for a network. The switch comprises an input port mechanism which receives cells of connections from the network. The switch comprises an output port mechanism which sends cells of connections to the network. The switch comprises a buffer mechanism for storing cells. The buffer mechanism is connected to the input port mechanism and the output port mechanism. The switch comprises a controller which provides service to traffic of connections received at the input port mechanism and which are to be sent out the output port mechanism. The controller monitors the change in the number of cells in the buffer mechanism and adjusts the service provided to the connections based on the change in the number of cells in the buffer mechanism. The controller is connected to the buffer mechanism.

The present invention pertains to a method for switching connections by a switch of a network. The method comprises the steps of monitoring the traffic of connections received by the switch and sent out the switch. Then there is the step of adjusting the service provided to the connections by the switch based on the traffic of connections received by the switch and sent out the switch.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1A:
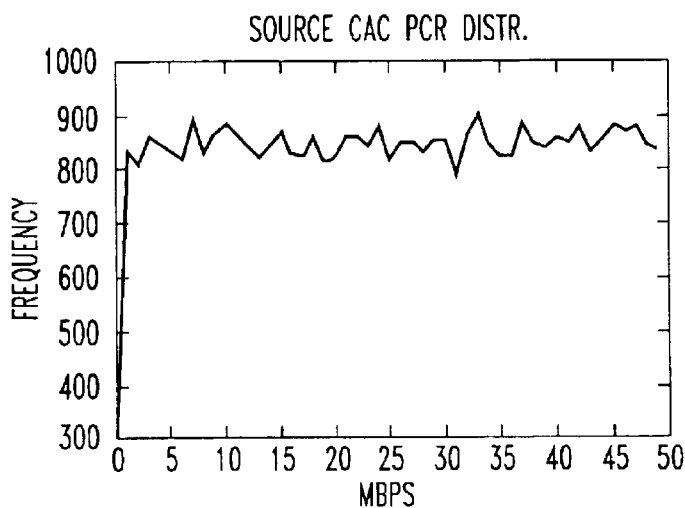
FIGS. 1a–1g show characteristics of calls generated in simulations.
Figure 1B:
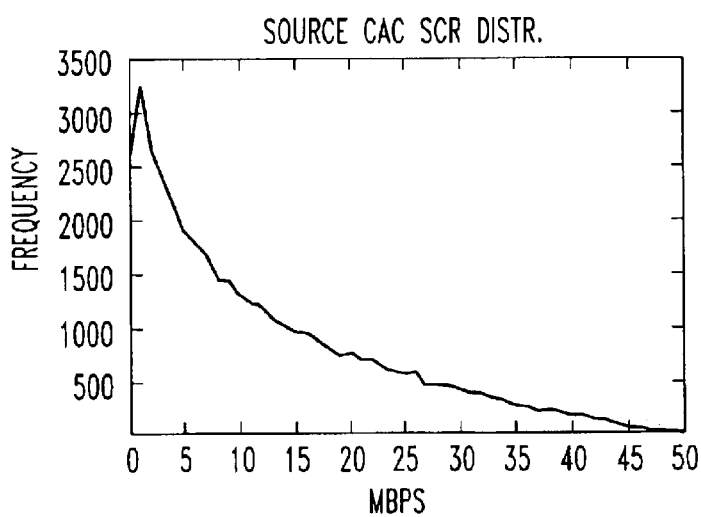
Figure 1C:
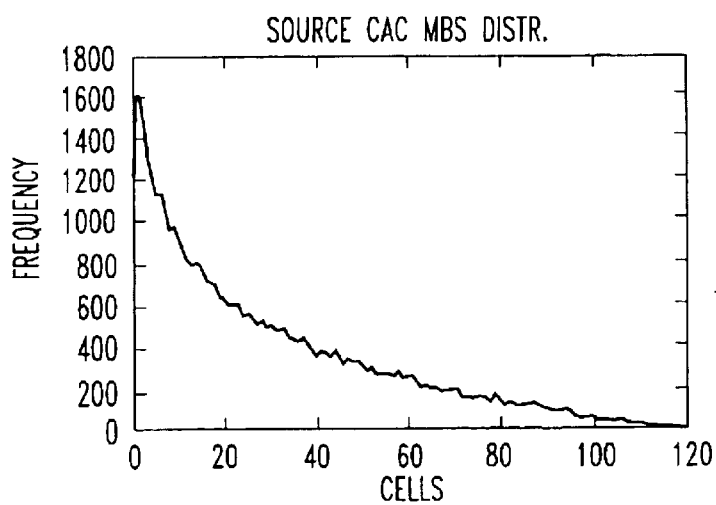
Figure 1D:
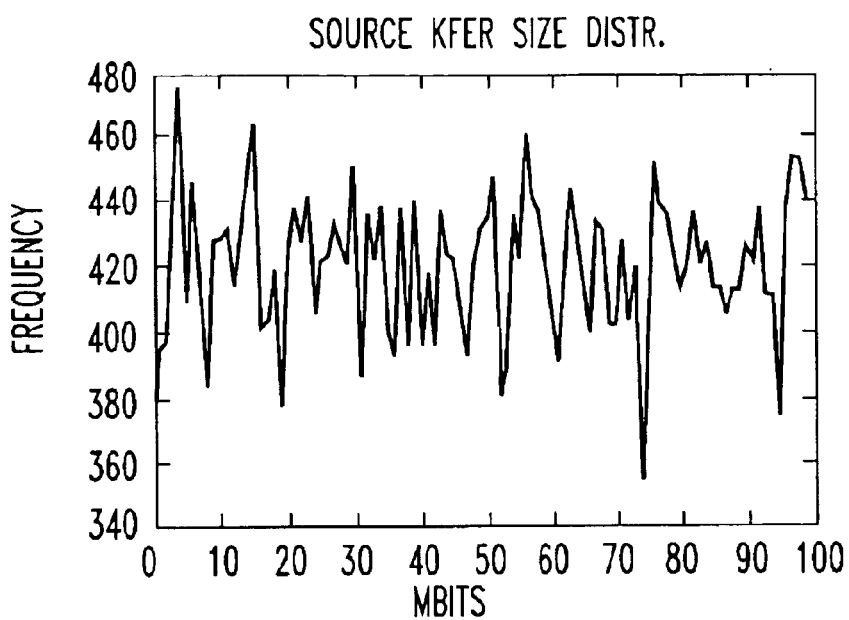
Figure 1E:
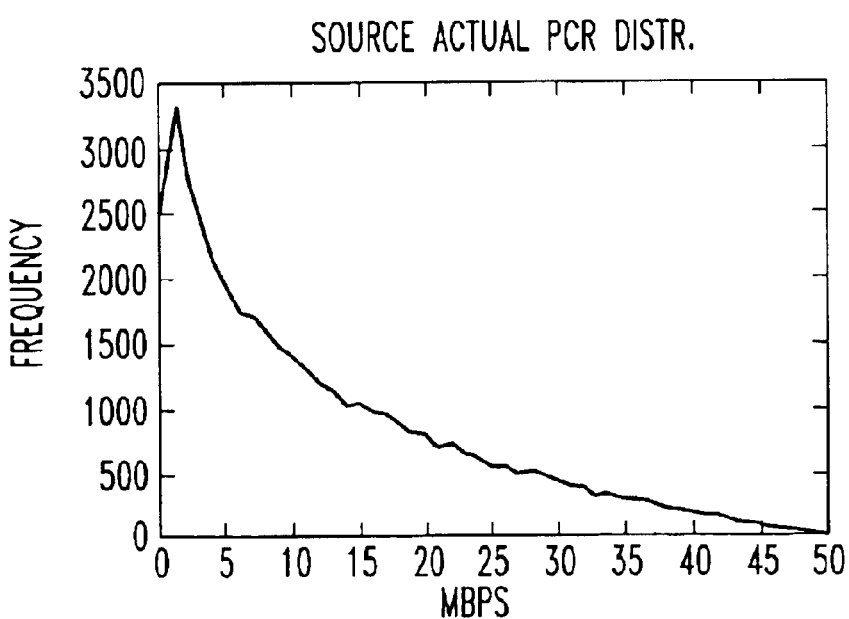
Figure 1F:
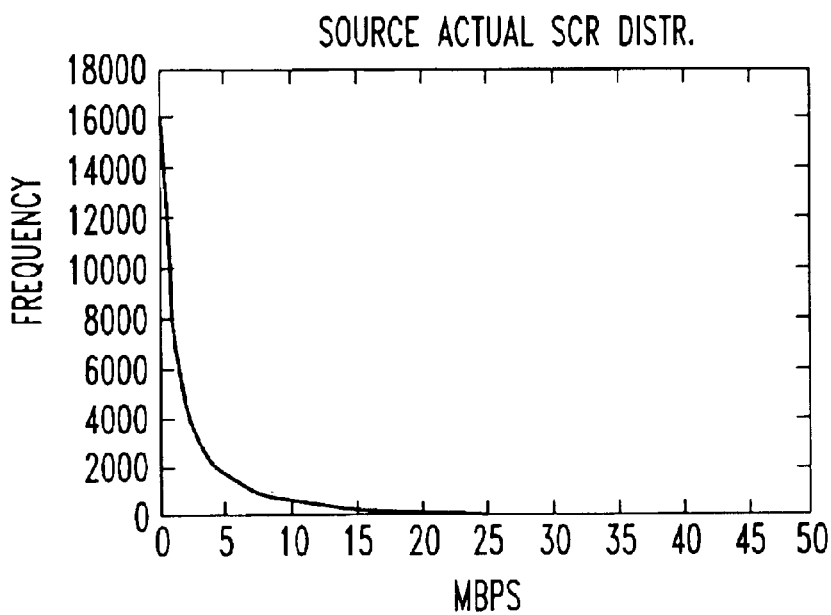
Figure 1G:
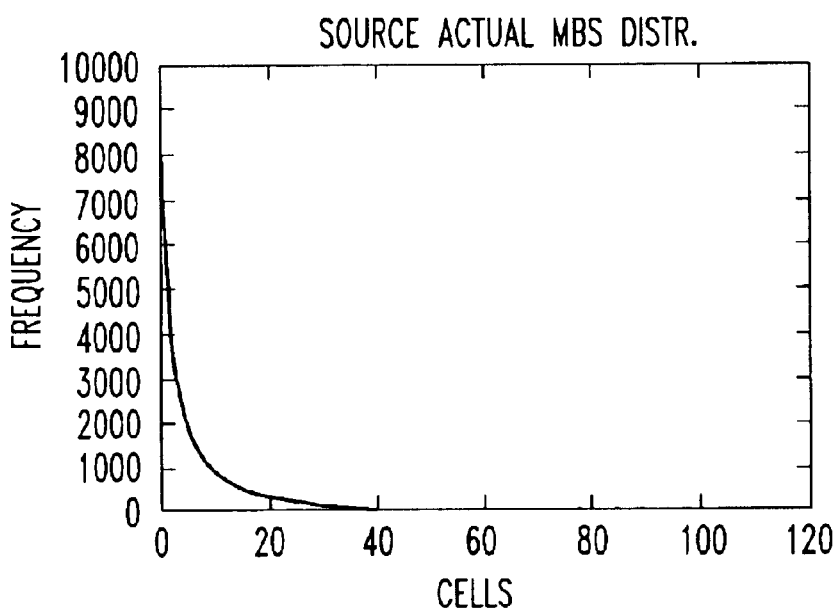
Figure 2A:
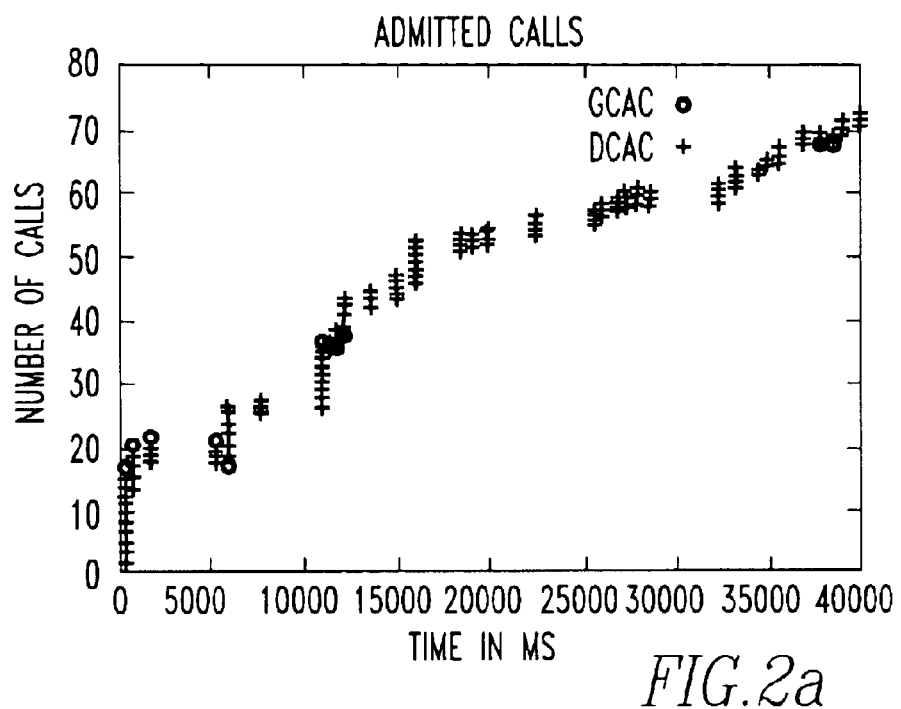
FIGS. 2a–2e show plots which depict observed number of calls admitted by gcac, number of calls rejected, gcac parameters, link utilization, and vbr buffer occupancy.
Figure 2B:
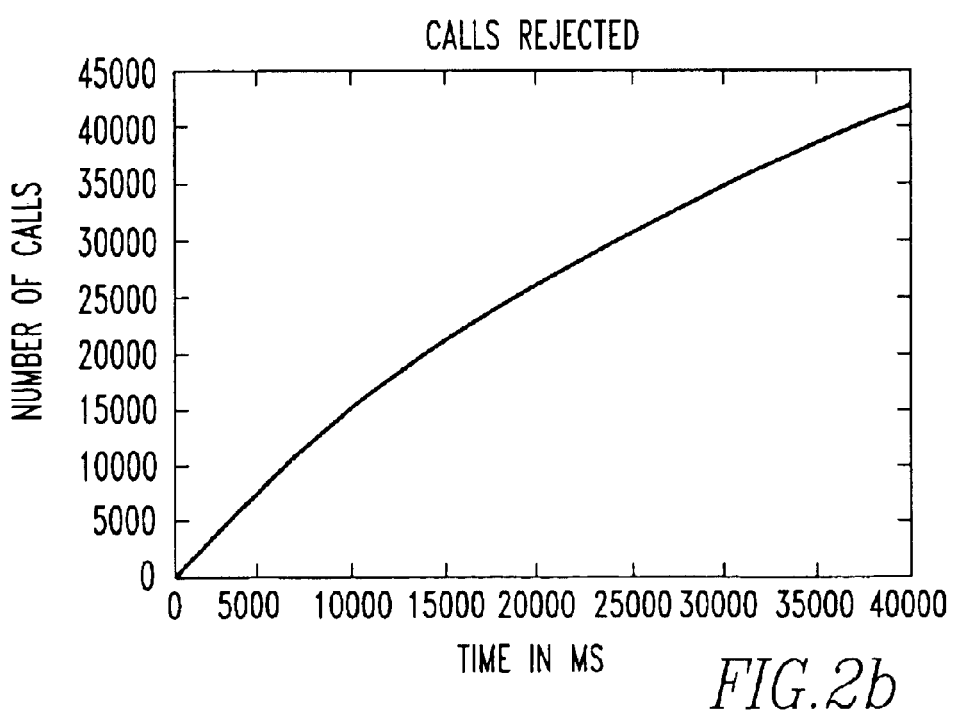
Figure 2C:
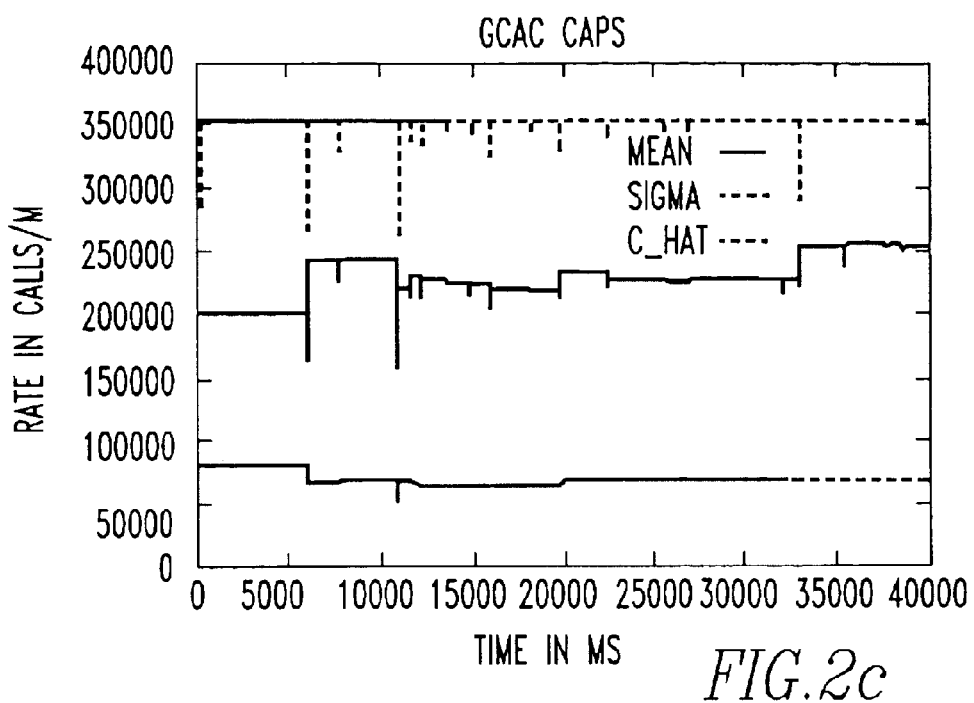
Figure 2D:
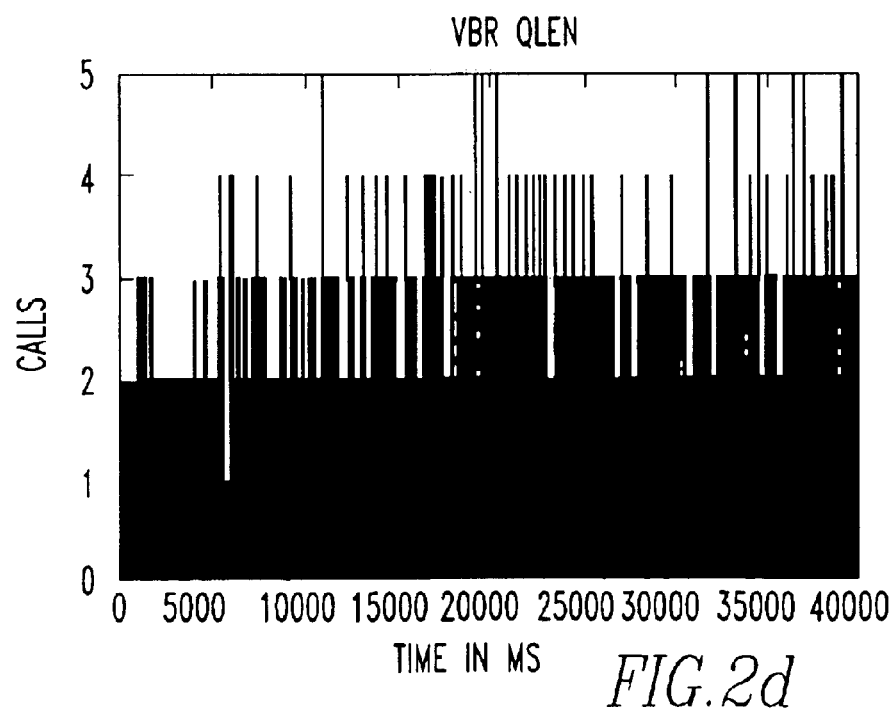
Figure 2E:
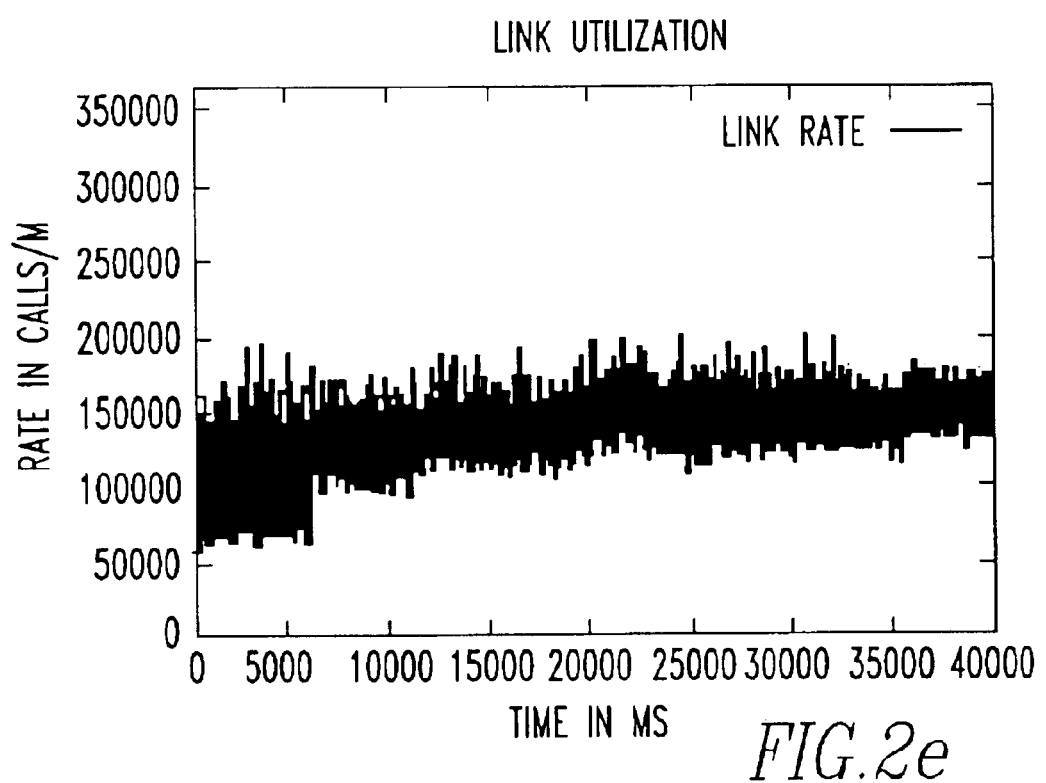
Figure 3A:
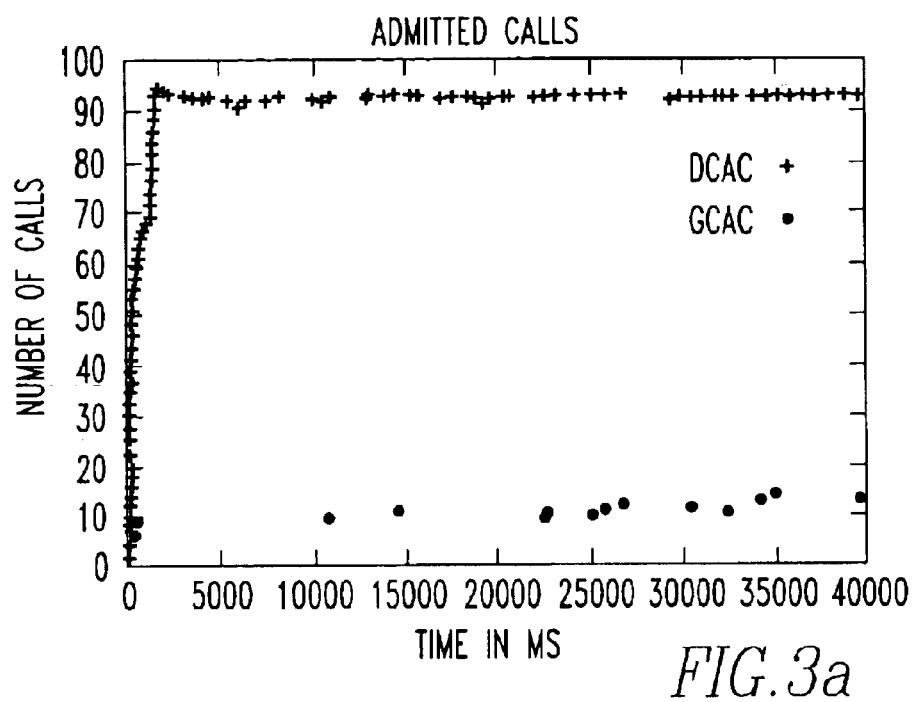
FIGS. 3a–3f are plots which depict observed number of calls admitted by dcac, number of calls rejected, dcac parameters, d-gcac parameters, link utilization, and vbr buffer occupancy. Note average link utilization with DCAC, remaining the pre-set 80% line rate or 292,400 cells/s, is much higher with dcac than with gcac as shown in earlier plots.
Figure 3B:
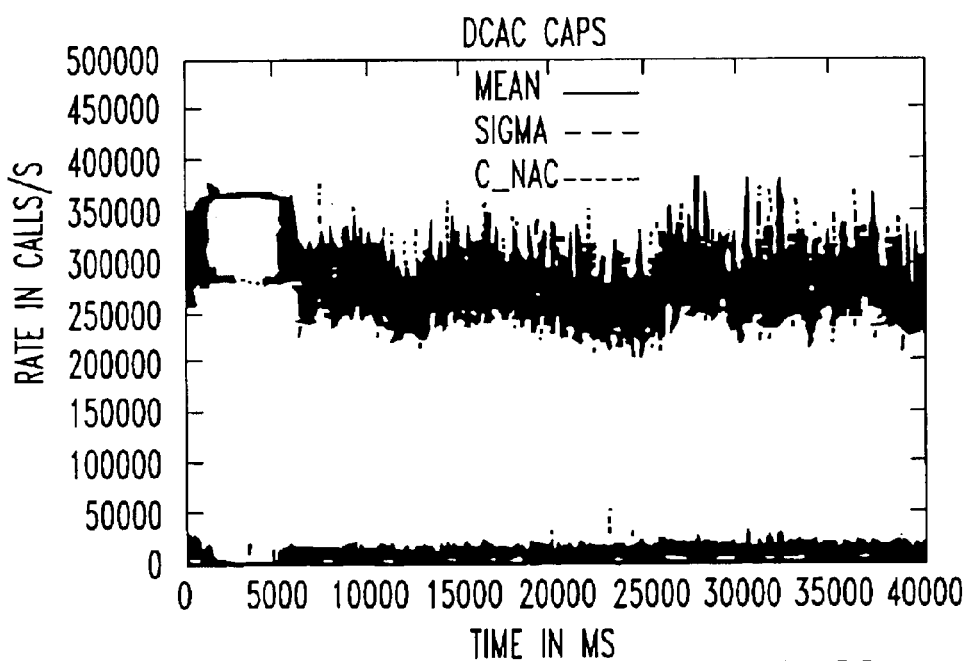
Figure 3C:
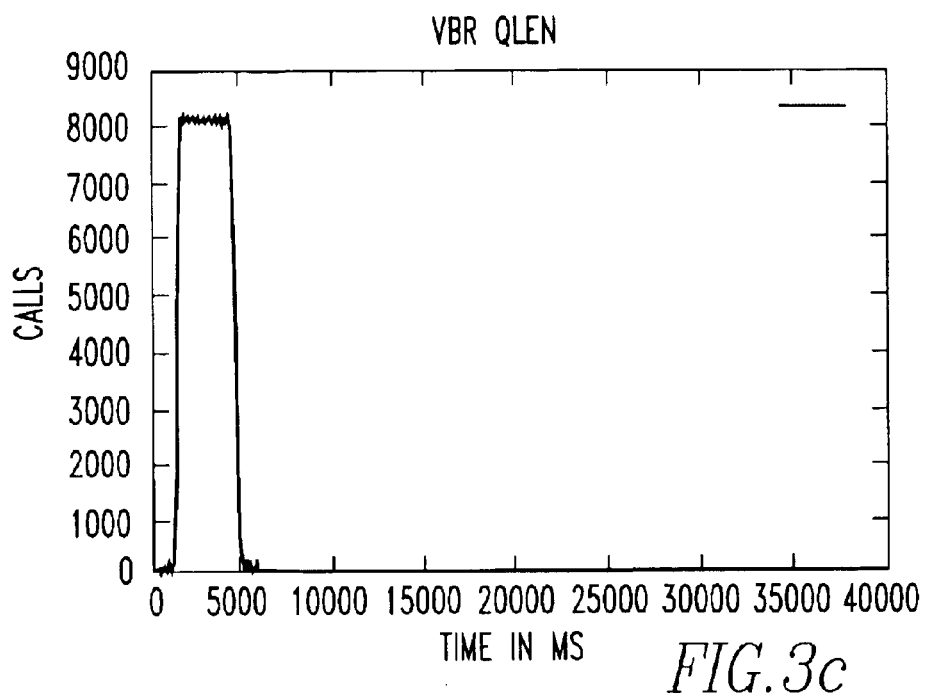
Figure 3D:
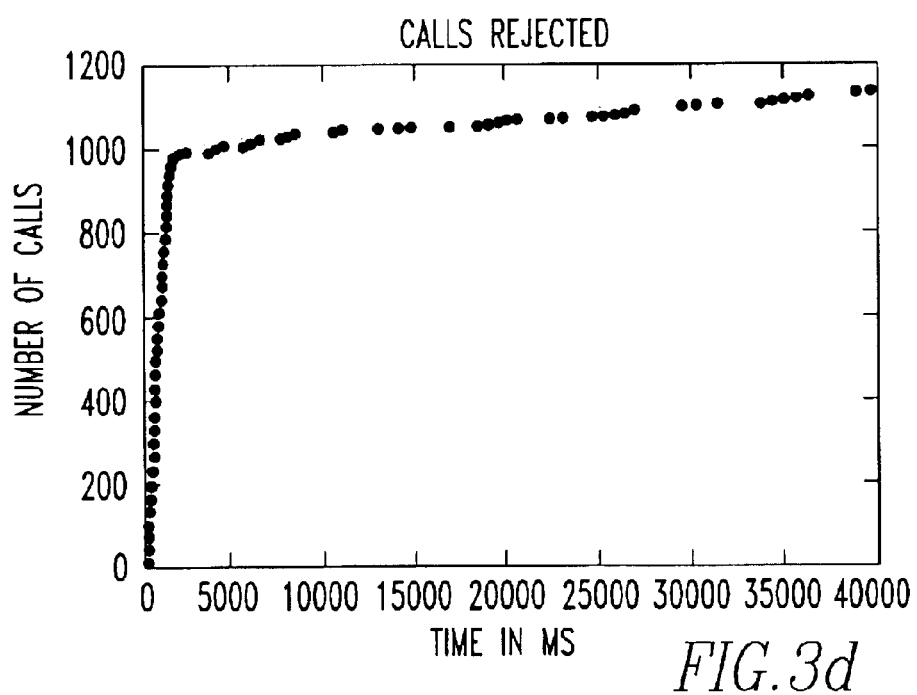
Figure 3E:
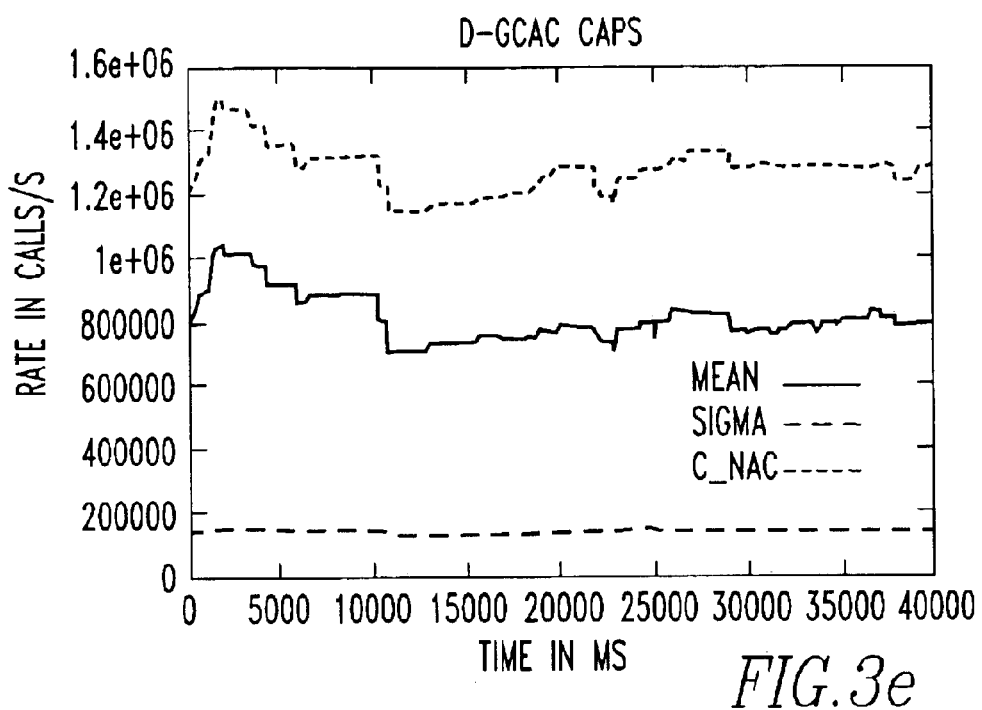
Figure 3F:
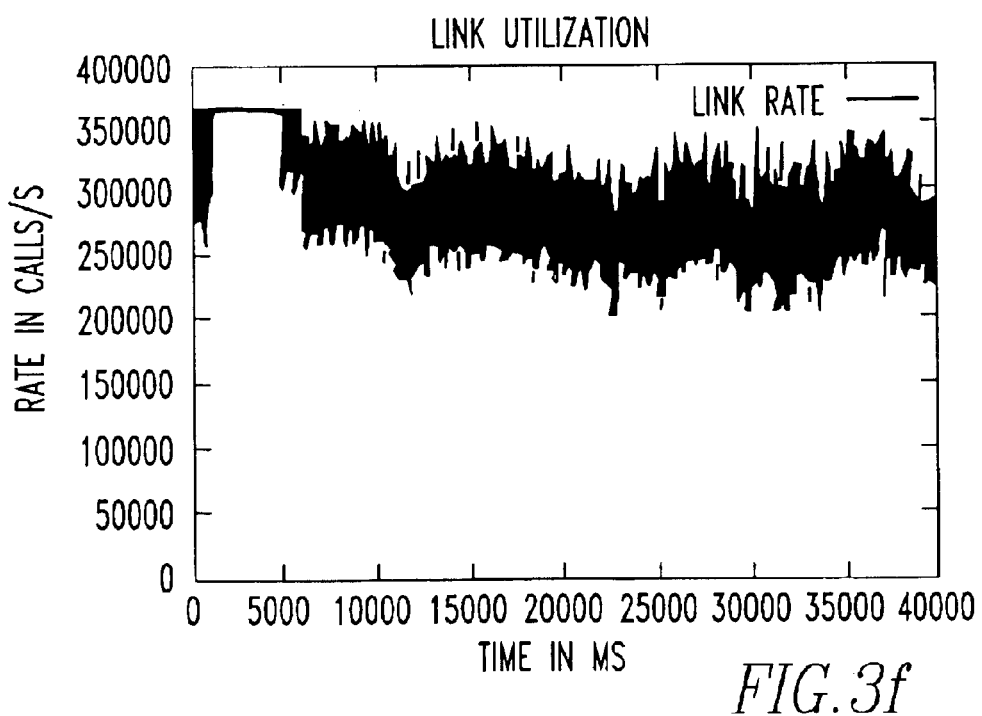
Figure 4:
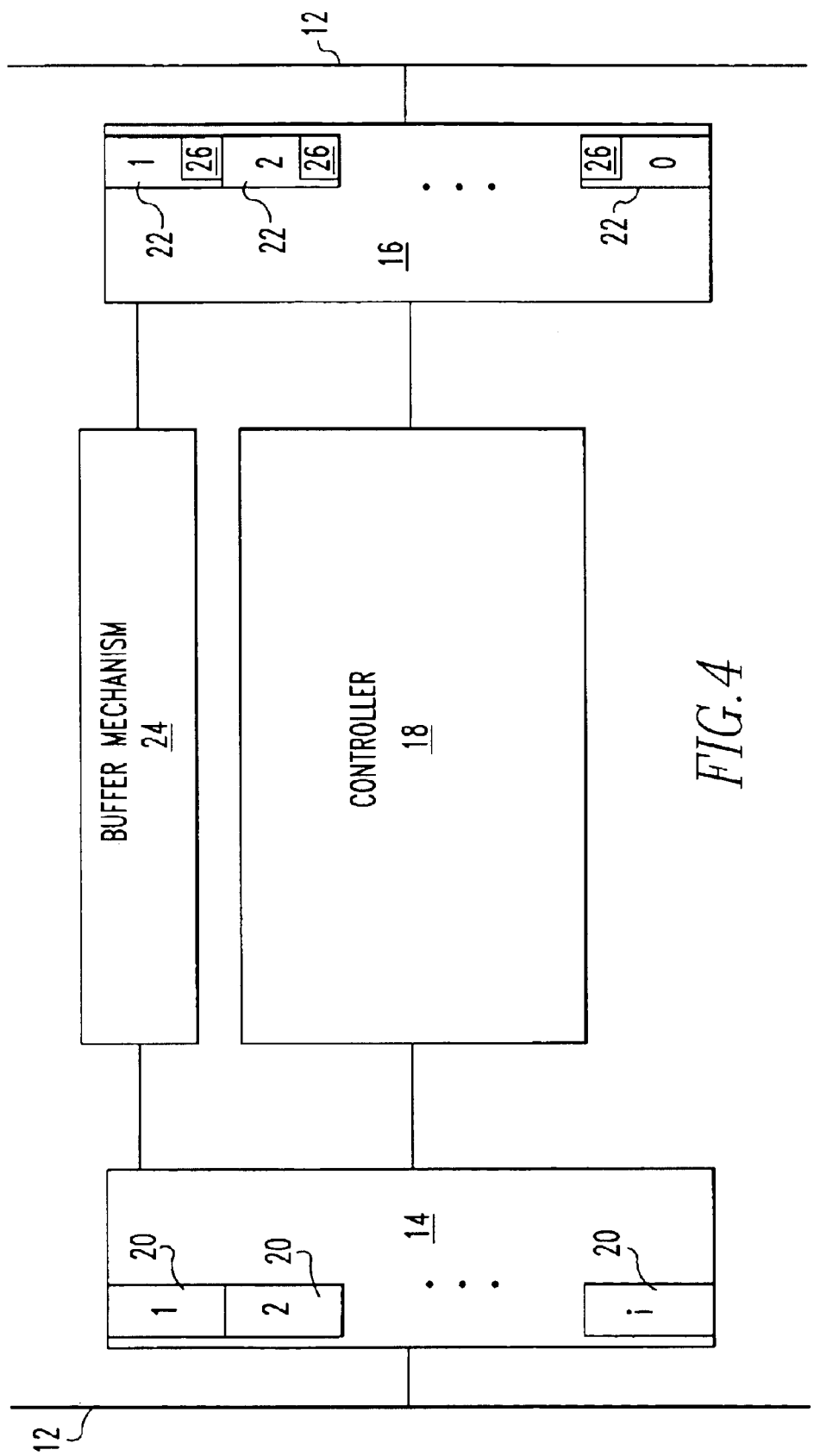
FIG. 4 is a schematic representation of a switch of the present invention.

Referring now to the drawings wherein like reference numerals refer to similar or identical parts throughout the several views, and more specifically to FIG. 4 thereof, there is shown a switch 10 for a network 12. The switch 10 comprises an input port mechanism 14 which receives traffic of connections from the network 12. Each connection has a priority. The switch 10 comprises an output port mechanism 16 which sends traffic of connections to the network 12. The switch 10 comprises a controller 18 which serves connections and which monitors the connections received by the input port mechanism 14 and sent by the output port mechanism 16 and releases connections according to a connection's priority when a predetermined condition exists in the switch 10. The controller 18 is connected to the input port mechanism 14 and the output port mechanism 16. Each connection requests a specific bandwidth from the controller 18.

Preferably, the predetermined condition includes an overload condition of the switch 10. The overload condition preferably includes receiving more traffic on connections received by the input port mechanism 14 than the controller 18 can process at a given time. Preferably, the controller 18 determines excess bandwidth associated with the overload condition, and the controller 18 releases the connection, for a given priority, with the closest match to the excess bandwidth.

The controller 18 preferably releases connections according to the connections' traffic class, where UBR connections are released first, then ABR connections are released next, then VBR connections are released next and then CBR connections are released from the switch 10. Preferably, the input port mechanism 14 comprises I input ports 20 connected to the controller 18, where I is an integer and greater than or equal to 1; and wherein the output mechanism comprises O output ports 22 connected to the controller 18, where O is an integer greater than or equal to 1. The controller 18 preferably releases the connection with the lowest priority.

Preferably, the controller 18 releases connections whose sum of requested bandwidths most closely matches the excess bandwidth. Preferably, the switch includes a buffer mechanism connected to the output port mechanism. The overload condition preferably exists if the sum of requested bandwidths of connections on an output port is greater than the output port's bandwidth and buffer resources associated with it are being exceeded $$\text{if } (Q_{vcbr} > T) \text{ and } (B^l_{eff} > B_{link})$$

where Qvcbr is the buffer occupancy for VBR/CBR traffic, T is a threshold, $B^l_{eff}$ is the aggregate effective bandwidth of connections on link l, and $B_{link}$ is the maximum link capacity or line rate.

The present invention pertains to a method for switch 10ing connections. The method comprises the steps of monitoring traffic of connections received by a switch 10. Then there is the step of releasing connections from the switch 10 according to the connection's priority when a predetermined condition in the switch 10 exists.

Preferably, the monitoring step includes the step of monitoring traffic of connections received by and sent out from the switch 10. The releasing step preferably includes the step of releasing connections when the predetermined condition of overload exists in the switch 10 where there is more traffic of connections received by the switch 10 than the switch 10 can process.

Preferably, the releasing step includes the steps of determining, when the overload condition exists, the excess bandwidth associated with the overload condition; choosing a connection, for a given priority, with the closest match to the excess bandwidth; and releasing the connection with the closest match to the excess bandwidth. The choosing step preferably includes the step of choosing the connection with the lowest priority.

Preferably, the choosing step includes the step of choosing the connections whose sum of requested bandwidths most closely matches the excess bandwidth. The choosing step preferably includes the step of choosing a connection according to traffic class for release, where UBR connections are released first, then ABR connections are released next, then VBR connections are released next and then CBR connections are released.

The present invention pertains to a switch 10 for a network 12. The switch 10 comprises an input port mechanism 14 which receives traffic of connections from the network 12. The switch 10 comprises an output port mechanism 16 which sends traffic of connections to the network 12. The switch 10 comprises a controller 18 which provides service to traffic of connections received at the input port mechanism 14 and which are to be sent out the output port mechanism 16. The controller 18 monitoring the traffic of connections received by the input port mechanism 14 and sent out the output port mechanism 16 and adjusting the service provided to the connections based on the traffic of connections received by the input port mechanism 14 and sent out the output port mechanism 16. The controller 18 is connected to the input port mechanism 14 and the output port mechanism 16.

The present invention pertains to a switch 10 for a network 12. The switch 10 comprises an input port mechanism 14 which receives cells of connections from the network 12. The switch 10 comprises an output port mechanism 16 which sends cells of connections to the network 12. The switch 10 comprises a buffer mechanism 24 for storing cells. The buffer mechanism 24 is connected to the input port mechanism 14 and the output port mechanism 16. The switch 10 comprises a controller 18 which provides service to traffic of connections received at the input port mechanism 14 and which are to be sent out the output port mechanism 16. The controller 18 monitors the change in the number of cells in the buffer mechanism 24 and adjusts the service provided to the connections based on the change in the number of cells in the buffer mechanism 24. The controller 18 is connected to the buffer mechanism 24.

Preferably, the controller 18 also monitors the number of cells of connections received by the input port mechanism 14 and sent out the output port mechanism 16 and adjusting the service provided to the connections based also on the number of cells of connections received by the input port mechanism 14 and sent out the output port mechanism 16. The controller 18 preferably admits a new connection to the output port mechanism 16 of the switch 10 if $$B^c_{\mathit{eff}} + B^{int}_{\mathit{eff}} + B^l_{act} \leq B_{link}$$

where $B^c_{\mathit{eff}}$ is the effective bandwidth of the new connection, $B^{int}_{\mathit{eff}}$ is the aggregate effective bandwidth of connections admitted within a current measurement interval int, $B^l_{act}$ reflects an actual aggregate measured traffic on link 1 on the network 12 connected with the switch 10 determined at the beginning of the current interval, and $B_{link}$ is the maximum link capacity or line rate of 1. Preferably, the controller 18 updates $B^{int}_{\mathit{eff}}$ during an interval if the connection $B^c_{\mathit{eff}}$ is admitted by $B^{int}_{\mathit{eff}} = B^{int}_{\mathit{eff}} + B^c_{\mathit{eff}} \cdot B_{act}$ is preferably based on current link utilization, variation in link utilization, buffer occupancy, and rate of change of buffer occupancy.

The present invention pertains to a method for switching connections by a switch 10 of a network 12. The method comprises the steps of monitoring the traffic of connections received by the switch 10 and sent out the switch 10. Then there is the step of adjusting the service provided to the connections by the switch 10 based on the traffic of connections received by the switch 10 and sent out the switch 10.

Preferably, the monitoring step includes the step of monitoring the change in the number of cells in a buffer mechanism 24 of the switch 10 and adjusting the service provided to the connections based on the change in the number of cells in the buffer mechanism 24.

In the operation of the invention, a dynamic CAC is used to overcome the problem of under-utilization of link bandwidth. The scheme, using periodic measurements, keeps track of various utilization parameters. These include the current link utilization, the variation in link utilization, buffer occupancy, and rate of change of buffer occupancy. Based on the above measurements a dynamic estimate of the effective bandwidth of the aggregate traffic on link, denoted by $B^l_{act}$, is computed.

A new connection with effective bandwidth, $B^c_{\mathit{eff}}$, is admitted if:

$$B^c_{\mathit{eff}} + B^l_{act} \leq B_{link} \tag{2}$$

The above approach using measurements is more realistic and leads to link bandwidth being maximally allocated and utilized. To compare the performance of this approach with the previous approach, $B^l_{\mathit{eff}}$ is tracked based on Eqn. 1. Thus, connections can be admitted in this scheme even with $B^l_{\mathit{eff}} > B_{link}$ for achieving better link bandwidth utilization. The flip side to this is the possible over-allocation of link bandwidth, leading to loss in QoS of connections.

Avoiding over-allocation in a measurement interval can be achieved in the following manner. Multiple new connections arriving between two measurements, based on Eqn. 2, will see the same last measured value of link utilization, $B^l_{act}$. Thus, the bandwidth taken up by admitted connections in a measurement interval is not reflected on subsequent admissions in the same interval. The above problem is solved by keeping track of the aggregate effective bandwidth of connections admitted within the interval, denoted by $B^{int}_{\mathit{eff}}$, and modifying Eqn. 2 as follows:

$$B^c_{\mathit{eff}} + B^{int}_{\mathit{eff}} + B^l_{act} \leq B_{link} \tag{3}$$

$B^{int}_{\mathit{eff}}$ is reset to zero at the beginning of any interval, once the value of $B^l_{act}$ has been updated based on measurement. During the interval if a connection is admitted, the parameter $B^{int}_{\mathit{eff}}$ is updated as, $B^{int}_{\mathit{eff}} += B^c_{\mathit{eff}}$, otherwise it remains unchanged.

For a connection being torn down, a similar adjustment to $B^{int}_{\mathit{eff}}$ can be made to reflect the freed up bandwidth. However, without actual per-connection usage statistics, it is not clear what the value of this credit should be. Clearly, $B^c_{\mathit{eff}}$ may be an over-estimation, and should not be used. Thus, preferably, bandwidth is chosen not to be credited for connections torn down during an interval. An accurate impact of torn-down connections is obtained at the next link rate measurement.

Detecting and recovering from over-allocation in the long run can be accomplished. A link can also become over-allocated when some or all admitted connections send traffic corresponding to their $B^c_{\mathit{eff}}$. The system allows for this to be detected and then recovered from. Congestion due to over-allocation is detected based on two conditions occurring: a) the buffer occupancy for VBR/CBR traffic, denoted by $Q_{vcbr}$, crossing a certain high threshold, T, and b) $B^l_{\mathit{eff}}$, computed based on Eqn. 1 being greater than $B_{link}$. The condition is expressed as:

if $(Q_{vcbr} > T)$ and $(B^l_{\mathit{eff}} > B_{link})$ congestion=true; else congestion= false; (4)

When over-allocation congestion is detected, recovery requires some connections to be released. A similar problem is also faced in an ATM network 12 using Inverse Multiplexing on ATM (IMA). In IMA, a link of larger capacity is emulated using multiple smaller capacity links. For example, a 6 Mbps link can be emulated using 4 DS-1 (1.5)Mbps) links using reverse multiplexing. With one or more of these smaller capacity links going down, IMA requires the emulation to continue on the remaining active links. However, the remaining capacity may not be adequate to support all the connections. Thus, it also requires some connections to be dropped.

Currently, The ATM Forum Traffic Management Specification version 4.0, incorporated by reference herein, specifies traffic classes such as CBR, VBR, ABR, and, UBR. This classification determines the service received, in terms of rate, cell delay, and jitter, by a given connection in an ATM network 12. However, there is no notion of a call release priority based on which calls can be ordered while dropping to avoid congestion. Each connection in the system has such a call release priority. Such a priority could be either specified by the user at call set-up or determined by the network 12 itself based on call characteristics.

When congestion is detected based on Eqn. 4, an estimate of the excess rate causing the congestion can be estimated from the rate of change of buffer occupancy and link utilization. Calls can then be released in decreasing order of their call release priority until congestion no longer holds. To minimize the number of calls being released, for a given priority, preferably the call with the closest match to the excess bandwidth is released first.

The details of a preferred embodiment of the algorithm is provided through the following pseudo-code.

Pseudo-code for a Task to Monitor Link Rates

The LINK_MONITOR_TASK task periodically monitors the transmitted CBR/VBR cell rate on each link. The period size is determined by a parameter LINK_MON_INTRVL_SIZE. The task keeps track of the measured rates from last N_INTRVLS (window size) Every interval a mean transmission rate and variance is computed based on a weighted function of the data points. For each link the task then uses the mean and variance to compute equivalent capacity.

burst_size computes its equivalent capacity. It then checks if the connection can be admitted without overallocating that link. It also updates the link capacity to reflect new call admitted in between measurements as discussed above.

To provide mutual exclusion in accessing the link capacity variables by the CONNECTION_ADMISSION_CONTROL and LINK_MONITOR_TASK task, semaphores are used. In the pseudo-code below, a single semaphore for all links in the switch 10 is used. Other mutual exclusion mechanisms, with or without semaphores, can be envisioned. For example, even with semaphores, the granularity of mutual exclusion by associating a semaphore with each link capacity variable can be extended.

```
LINK_MONITOR_TASK (LINK_MON_INTRVL_SIZE, N_INTRVLS, intrvl_weight
[N_INTRVLS])
begin
while (1)
    curr_intrvl = (curr_intrvl + 1) % N_INTRVLS
    /* Grab semaphore for updating Link Capacities */
    semTake (linkMonitorSem);
    for (linkid over all links)
        /* Compute link cvbr tx rate in this intrvl */
        CellRate[linked][curr_intrvl] = VCbrCellsSentThisIntrvl/LINK_MON_INTRVL SIZE;
        /* Compute mean rate based on data points from last N_INTRVLS */
        for (1 = 0; 1 < N_INTRVLS; 1++)
            win = (curr_intrvl + 1) % N_INTRVLS;
            mean += CellRate[linkid][win] * intrvl_weight[1];
        end for
        /* Compute variance of rate based on data points from last N_INTRVLS */
        for (1 = 0; 1 < N_INTRVLS; 1++)
            WIN = (CURR_INTRVL + 1) % N_INTRVLS;
            D = CellRate[linkid][win] - mean;
            var += D*D*intrvl_weight[1];
        end for
        /* Update Link Capacity */
        DCAC_LINK_EQUIV_CAPACITY (linkid, mean, var);
    end for
    /* Release semaphore */
    semGive(linkMonitorSem);
    /* Sleep until next measurement point */
    sleep (LINK_MON_INTRVL_SIZE);
end while
end
```

Pseudocode for Dynamic Call Admission Algorithm

The CONNECTION_ADMISSION_CONTROL routine, for a new connection with given mean, peak, and

```
CONNECTION_ADMISSION_CONTROL (linkid, mean, peak, burst_size)
begin
    /* Compute equivalent capacity of new connection */
    bufsz = reserved_buf space_for_vbr [linkid];
    CONNECTION_EQUIV_CAPACITY (mean, peak, burst_size, bufsz, ConnCapacity);
    /* Grab semaphore for using and updating Link Capacity */
    semTake (linkMonitorSem);
    /* Add the equiv capacity of the new connection to the equiv capacity of the link */
    DCACLinkCapacity [linkid] += ConnCapacity;
    /* If link overallocated? revert change to link capacity and reject connection */
```

-continued

```
    bw = XLATE_EQUIV_CAP_TO_BANDWIDTH (LinkCapacity [linkid] );
    if (bw > LinkLineRate)
        DCACLinkCapacity [linkid] -= ConnCapacity;
        semGive (linkMonitorSem); /* Release semaphore */
        return REJECT_CONNECTION;
    /* Keep track of GCAC based link capacity for use in flow model based
    * DCAC capacity estimation */
    GCACLinkCapacity [linkid] += ConnCapacity;
    /* Release semaphore */
    semGive(linkMonitorSem);
    return ACCEPT_CONNECTION;
end
```

Pseudocode for Equivalent Capacity Computations

In a preferred embodiment, two different equivalent capacity measures are kept track of. The first one based on the stationary model maintains the mean and variance (M,V) of traffic. The second method is based on a flow model maintains a parameter ĉ as discussed in R. Guerin, H. Ahmadi, and M. Naghshineh, incorporated by reference herein. Equivalent capacity and its application to bandwidth allocation in high-speed networks 12. *IEEE Journal on Selected Areas in Communication*, 9(7):968–981, September 1991, incorporated by reference herein. Both measures have the property that they are additive. Thus, for the stationary model combining two different equivalent capacities, (M1, V1) and (M2, V2) leads to (M1+M2, V1+V2). Similarly, in the flow model combining two different equivalent capacities, ($\hat{c}_1$) and ($\hat{c}_2$) leads to ($\hat{c}_1+\hat{c}_2$). The translation from the metric of equivalent capacity to required bandwidth (BW) is as follows. In the stationary model, BW=M+α√V, where α=√(−2log(ε)−log(2Π)), while in the flow model BW=C. The value of BW used in an embodiment is minimum of the values derived from the two models.

```
/* Compute the equivalent capacity of a link based on its measured mean rate and variance */
DCAC_LINK_EQUIV_CAPACITY (linkid, mean, var)
begin
    /* Update link capacity parameters for stationary mode, */
DCACLinkCapacity [linkid].mean = mean;
    DCACLinkCapacity[linkid].var = var;
    /* Update link capacity parameter for flow model */
        t = GCACLinkCapacity[linkid].mean + α√GCACLinkCapacity[linkid].var;
        t1 = DCACLinkCapacity[linkid].mean + α√DCACLinkCapacity[linkid].var;
        DCACLinkCapacity[linkid]->flow_cap=GCACLinkCapacity[linkid]->flow_cap*(t1/t);
end
/* Compute the equivalent capacity of a new connection */
CONNECTION_EQUIV_CAPACITY (mean, peak, burst_size, bufsz, ConnCapacity)
begin
    /* Update link capacity parameters for stationary model */
    ConnCapacity.mean = mean;
    ConnCapacity.var = var;
    /* Update link capacity parameter for flow model */
    ConnCapacity.flow_cap = ĉ (peak, mean, burst_size, bufsz);
end
```

EXAMPLE

Modeling Assumptions

Traffic Model
  VBR entity Parameters:
  Period Between Calls [O 100.00] ms
  Range of CAC_PCR [0.5,50.0] Mbps
  Range of CAC_SCR [0.45,CAC_PCR] Mbps
  Range of CAC_MBS [1 cell, 1000] us
  Mean CAC_MIS=mean CAC_MBS
  Range of ACT_PCR [0.45,CAC_PCR] Mbps
  Range of ACT_MBS [5, CAC_MBS] us
  Range of ACT_MIS [CAC_MIS, 250+CAC_MIS] us
  Range of transfer size [0.1,100] Mbits
  Link Parameters for Equiv_cap Computation
  VBR: queue sz 256, VBR_OB 100, VBR_BUFF_OB 100
  Link Parameters for DCAC
  Max. allowed until by VBR 0.80 LR
  Link monitoring interval 5.000000 ms
  Monitoring data maintained for 4 windows: Window weights: 0.50 0.25 0.15 0.10

FIGS. 1a–1g show characteristics of calls generated in simulations. Plots depict distribution of pcr, scr, and mbs requested by calls during CAC. The distribution of actual pcr, scr, and mbs generated by calls are also depicted alongside. The distribution of the transfer size is also depicted. In this experiment, total number of calls generated were ≈45,000. Note, these statistics are for all calls, accepted/rejected.

FIGS. 2a–2e show plots which depict observed number of calls admitted by gcac, number of calls rejected, gcac parameters, link utilization, and vbr buffer occupancy. Note average link utilization with GCAC is around 150,000 cells/s or 40% line rate.

Experiment 1: GCAC

FIGS. 3a–3f depicts the plots for observed number of calls admitted by GCAC, number of calls rejected, gcac parameters, link utilization, and vbr buffer occupancy. Note average link utilization with GCAC is around 150,000 cells/s or 40% line rate. From these observations, it can be concluded that for the calls being generated in this experiment, the average value of CAC was only 40% of requested value.

Experiment 2: DCAC

The above experiment was repeated with DCAC. The link bandwidth available to DCAC was set to 80% of line rate. The idea being to reserve some bandwidth, in this case 20% line rate, to allow for admitted calls to intermittently burst up to their requested CAC parameters.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A switch for a network which switches traffic of connections admitted by the switch comprising:

an input port mechanism which receives traffic of connections on at least one link from the network, each connection having a priority;

an output port mechanism which sends traffic of admitted connections to the network;

a controller which serves connections, which computes a dynamic estimate of an effective bandwidth of the link, and which monitors the admitted connections received by the input port mechanism and sent by the output port mechanism and releases admitted connections according to a priority of an admitted connection when an overload condition exists in the switch, said controller connected to the input port mechanism and the output port mechanism, each connection requesting a specific bandwidth from the controller, the overload condition includes receiving more traffic on admitted connections received by the input port mechanism than the controller can process at a given time, the controller determines excess bandwidth associated with the overload condition, and the controller releases the admitted connection, for a given priority, with the closest match to the excess bandwidth, the controller releases admitted connections according to the admitted connections' traffic class, where UBR connections are released first, then ABR connections are released next, then VBR connections are released next and then CBR connections are released from the switch, the input port mechanism comprises I input ports connected to the controller, where I is an integer and greater than or equal to 1; and wherein the output mechanism comprises O output ports connected to the controller, where O is an integer greater than or equal to 1, the controller releases the admitted connection with the lowest priority; and a buffer mechanism connected to the output port mechanism and wherein the overload condition exists if the sum of requested bandwidths of admitted connections on an output port is greater than the output port's bandwidth and buffer resources associated with it are being exceeded, if $(Q_{vcbr} > T)$ and $(B^l_{eff} \geq B_{link})$ where Qvcbr is the buffer occupancy for VBR/CBR traffic, T is a threshold, $B^l_{eff}$ is the aggregate effective bandwidth of connections on link l, and $B_{link}$ is the maximum link capacity or line rate.

2. A switch as described in claim 1 wherein the controller releases admitted connections whose sum of requested bandwidths most closely matches the excess bandwidth.

3. A method for switching admitted connections comprising:

monitoring traffic of admitted connections received by a switch with a controller;

releasing admitted connections from the switch according to a priority of an admitted connection when an overload condition in the switch exists; and taking periodic measurements with the controller at intervals of an actual aggregate measured traffic on link l on the network connected with the switch; and admitting a new connection to the output port mechanism of the switch if $$B^c_{eff} + B^{int}_{eff} + B^l_{act} \leq B_{link}$$

where $B^c_{eff}$ is the effective bandwidth of the new connection, $B^{int}_{eff}$ is the aggregate effective bandwidth of connections admitted within a current measurement interval int, $B^l_{act}$ reflects the actual aggregate measured traffic on link l on the network connected with the switch determined at the beginning of the current interval, and $B_{link}$ is the maximum link capacity or line rate of l.

4. A method as described in claim 3 wherein the monitoring step includes the step of monitoring traffic of admitted connections received by and sent out from the switch.

5. A method as described in claim 4 wherein the releasing step includes the step of releasing admitted connections when the predetermined condition of overload exists in the switch where there is more traffic of admitted connections received by the switch than the switch can process.

6. A method as described in claim 5 wherein the releasing step includes the steps of determining, when the overload condition exists, the excess bandwidth associated with the overload condition; choosing an admitted connection, for a given priority, with the closest match to the excess bandwidth; and releasing the admitted connection with the closest match to the excess bandwidth.

7. A method as described in claim 6 wherein the choosing step includes the step of choosing the admitted connection with the lowest priority.

8. A method as described in claim 7 wherein the choosing step includes the step of choosing the admitted connections whose sum of requested bandwidths most closely matches the excess bandwidth.

9. A method as described in claim 8 wherein the choosing step includes the step of choosing an admitted connection according to traffic class for release, where UBR connections are released first, then ABR connections are released next, then VBR connections are released next and then CBR connections are released.

10. A switch for a network comprising:

an input port mechanism which receives traffic of connections from the network;

an output port mechanism which sends traffic of admitted connections to the network; and a controller which provides service to traffic of admitted connections received at the input port mechanism and which are to be sent out the output port mechanism, said controller dynamically monitoring the traffic of admitted connections received by the input port mechanism and sent out the output port mechanism and adjusting the service provided to the admitted connections based on the traffic of admitted connections received by the input port mechanism and sent out the output port mechanism, said controller connected to the input port mechanism and the output port mechanism, the controller takes periodic measurements at intervals of the actual aggregate measured traffic on link l on the network connected with the switch and admits a new connection to the output port mechanism of the switch if $$B^c_{\mathit{eff}}+B^{int}_{\mathit{eff}}+B^l_{act}\leq B_{link}$$

where $B^c_{\mathit{eff}}$ is the effective bandwidth of the new connection, $B^{int}_{\mathit{eff}}$ is the aggregate effective bandwidth of connections admitted within a current measurement interval int, $B^l_{act}$ reflects the actual aggregate measured traffic on link l on the network connected with the switch determined at the beginning of the current interval, and $B_{link}$ is the maximum link capacity or line rate of l.

11. A switch for a network comprising:

an input port mechanism which receives cells of connections from the network;

an output port mechanism which sends cells of admitted connections to the network;

a buffer mechanism for storing cells, said buffer mechanism connected to the input port mechanism and the output port mechanism; and a controller which provides service to traffic of admitted connections received at the input port mechanism and which are to be sent out the output port mechanism, said controller dynamically monitoring the change in the number of cells in the buffer mechanism and adjusting the service provided to the admitted connections based on the change in the number of cells in the buffer mechanism, said controller connected to the buffer mechanism, the controller also monitors the number of cells of admitted connections received by the input port mechanism and sent out the output port mechanism and adjusting the service provided to the admitted connections based also on the number of cells of admitted connections received by the input port mechanism and sent out the output port mechanism, the controller takes periodic measurements at intervals of an actual aggregate measured traffic on link l on the network connected with the switch and admits a new connection to the output port mechanism of the switch if $$B^c_{\mathit{eff}}+B^{int}_{\mathit{eff}}+B^l_{act}\leq B_{link}$$

where $B^c_{\mathit{eff}}$ is the effective bandwidth of the new connection, $B^{int}_{\mathit{eff}}$ is the aggregate effective bandwidth of connections admitted within a current measurement interval int, $B^l_{act}$ reflects the actual aggregate measured traffic on link l on the network connected with the switch determined at the beginning of the current interval, and $B_{link}$ is the maximum link capacity or line rate of l.

12. A switch as described in claim 11 wherein the controller updates $B^{int}_{\mathit{eff}}$ during an interval if the connection $B^c_{\mathit{eff}}$ is admitted by $$B^{int}_{\mathit{eff}}=B^{int}_{\mathit{eff}}+B^c_{\mathit{eff}}.$$

13. A switch as described in claim 12 wherein $B_{act}$ is based on current link utilization, variation in link utilization, buffer occupancy, and rate of change of buffer occupancy.

14. A method for switching admitted connections by a switch of a network comprising the steps of:

monitoring the traffic of admitted connections received by the switch and sent out the switch with a controller, including monitoring the change in the number of cells in a buffer mechanism of the switch;

adjusting the service provided to the admitted connections by the switch based on the traffic of admitted connections received by the switch and sent out the switch and the change in the number of cells in the buffer mechanism; and taking periodic measurements with the controller at intervals of an actual aggregate measured traffic on link l on the network connected with the switch; and admitting a new connection to the output port mechanism of the switch if $$B^c_{\mathit{eff}}+B^{int}_{\mathit{eff}}+B^l_{act}\leq B_{link}$$

where $B^c_{\mathit{eff}}$ is the effective bandwidth of the new connection, $B^{int}_{\mathit{eff}}$ is the aggregate effective bandwidth of connections admitted within a current measurement interval int, $B^l_{act}$ reflects the actual aggregate measured traffic on link l on the network connected with the switch determined at the beginning of the current interval, and $B_{link}$ is the maximum link capacity or line rate of l.

15. A switch for a network which switches traffic of connections admitted by the switch comprising:

an input port mechanism which receives traffic of connections on at least one link from the network, each connection having a priority;

an output port mechanism which sends traffic of admitted connections to the network; and a controller which serves connections, which computes a dynamic estimate of an effective bandwidth of the link, and which monitors the admitted connections received by the input port mechanism and sent by the output port mechanism and releases admitted connections according to a priority of an admitted connection when a predetermined condition exists in the switch, said controller connected to the input port mechanism and the output port mechanism, each connection requesting a specific bandwidth from the controller, the controller takes periodic measurements at intervals of the actual aggregate measured traffic on link l on the network connected with the switch and admits a new connection to the output port mechanism of the switch if $$B^c_{\mathit{eff}}+B^{int}_{\mathit{eff}}+B^l_{act}\leq B_{link}$$

where $B^c_{\mathit{eff}}$ is the effective bandwidth of the new connection, $B_{int\mathit{eff}}$ is the aggregate effective bandwidth of connections admitted within a current measurement interval int, $B^l_{act}$ reflects the actual aggregate measured traffic on link l on the network connected with the switch determined at the beginning of the current interval, and $B_{link}$ is the maximum link capacity or line rate of l.

* * * * *